United States Patent

[11] 3,624,520

[72] Inventors Frank A. Perkins, Jr.
6595 Sheridan Road, Melbourne Village, Fla. 32901;
James A. Proctor, 420 2nd Ave., Melbourne Beach, Fla. 32951

[21] Appl. No. 684
[22] Filed Jan. 5, 1970
[45] Patented Nov. 30, 1971
Continuation-in-part of application Ser. No. 638,809, May 16, 1967. This application Jan. 5, 1970, Ser. No. 684

[54] WIDE BAND DIGITAL PHASE DETECTOR
10 Claims, 5 Drawing Figs.

[52] U.S. Cl. .......... 328/72, 178/68, 179/15 AP, 328/44, 328/63
[51] Int. Cl. .......... H03k 1/00
[50] Field of Search .......... 178/67, 68; 179/15 AP; 328/44, 63, 72; 307/269

[56] References Cited
UNITED STATES PATENTS

| | | | |
|---|---|---|---|
| 3,091,664 | 5/1963 | Tyrlick | 179/15 |
| 3,112,363 | 11/1963 | Schramel et al. | 179/69.5 X |
| 3,271,688 | 9/1966 | Gschwind et al. | 328/63 |
| 3,404,230 | 10/1968 | Hailey et al. | 328/63 X |
| 3,206,665 | 9/1965 | Burlingham | 328/44 X |

*Primary Examiner*—Stanley D. Miller, Jr.
*Assistant Examiner*—R. C. Woodbridge
*Attorney*—Donald R. Greene ABSTRACT: A wholly digital system for processing incoming PCM data which lacks a frequency component at bit rate, to provide signals which can be compared with a clock output to develop a phase-locking signal for the clock, by digitally filtering a sliced version of the PCM data, digitally rectifying the digital output of the filter and digitally comparing the rectified output with clock output in a digital multiplier to derive phase information.

INVENTORS
FRANK A. PERKINS
& JAMES A. PROCTOR
BY Hurwitz, Rose & Greene
ATTORNEYS INVENTORS
FRANK A. PERKINS
& JAMES A. PROCTOR
BY Hurvitz, Rose & Greene
ATTORNEYS

WIDE BAND DIGITAL PHASE DETECTOR

CROSS-REFERENCE

This application is a continuation in part of application, Ser. No. 638,809, filed May 16, 1967, entitled WIDE BAND DIGITAL PHASE DETECTOR.

BACKGROUND OF THE INVENTION

The present invention relates generally to digital data transmission systems, and more particularly to apparatus at a receiving station for synchronizing a local clock with the digit rate of an incoming digital information signal.

PCM signals require comparison with clock signals to recover information, and to this end the clock signals must be synchronized with the PCM bits. It is usual to accomplish this by means of a phase-locked loop, which implies employing a phase detector to measure phase difference between clock output and incoming PCM bits.

However, some types of PCM signals, for example, non-return-to-zero or NRZ codes, and split phase codes, lack any frequency component to which the clock pulses can be locked. Such signals can be rectified to develop the required frequency component. Rectangular data waveforms cannot be so handled, because if they are the output waveform is like the input waveform except for a DC component. The data therefore have to be filtered before being rectified. A low-pass filter is preferred, because it retains less of the noise accompanying the signal. A linear low-pass filter is preferred, because it retains less of the noise accompanying the signal. A linear low-pass filter would be adequate were it not that bit rate may be variable over a wide range of frequencies, necessitating a complex tunable filter, for a practical system, which must respond to any bit rate which may be received. This invention provides, as one of its features, a digital low-pass filter, readily tunable by varying a strobe rate. The digital filter has a numerical digital output. This numerical digital output must be rectified, but since the signal is numerical digital, a digital rectifier is required, to provide which is a further object of the invention. The digital signal representing the result of rectification is now digitally phase compared with the clock output, to generate a digital signal representing phase difference, and to do this is a third object of the invention.

The last named digital signal may be converted to analog form and the analog signal then employed to synchronize the clock, in conventional fashion. It is assumed that the filter is tunable manually by varying strobe frequency.

It is a fourth object of the invention to provide a fully digitized phase-locked loop, responsive to PCM signals having no readily available bit frequency.

SUMMARY OF THE INVENTION

A digital tunable filter, a digital rectifier and a digital phase comparator are connected in a digital phase-locked loop used to decode an incoming PCM signal.

BRIEF DESCRIPTION OF THE DRAWINGS

The above and still further objects, features and attendant advantages of the present invention will become apparent from a consideration of the following detailed description of a preferred exemplary embodiment thereof, especially when taken in conjunction with the accompanying drawings, in which.

DESCRIPTION OF THE PREFERRED EMBODIMENT

Figure 1:
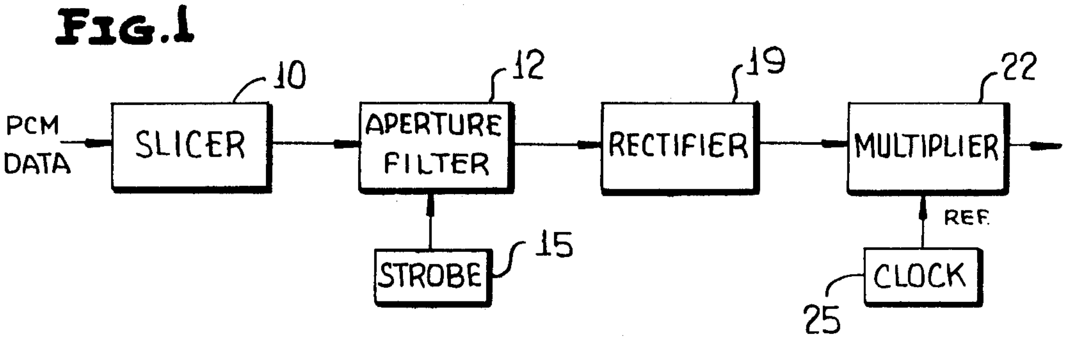
FIG. 1 is a block circuit diagram of an illustrative embodiment of the phase detector in accordance with the invention.

Assume, in FIG. 1, that slicer 10 slices at ground, and that the signals it sees are centered about ground. The input to filter 12 is then a rectangular signal even if the input to the slicer is a continuously varying waveform. Output polarity is determined at each instance of time by input signal polarity, so that the output of slicer 10 is a rectangular waveform, which goes positive and negative at constant amplitudes with transitions at the zero crossings of the input signal to the slicer.

Figure 2:
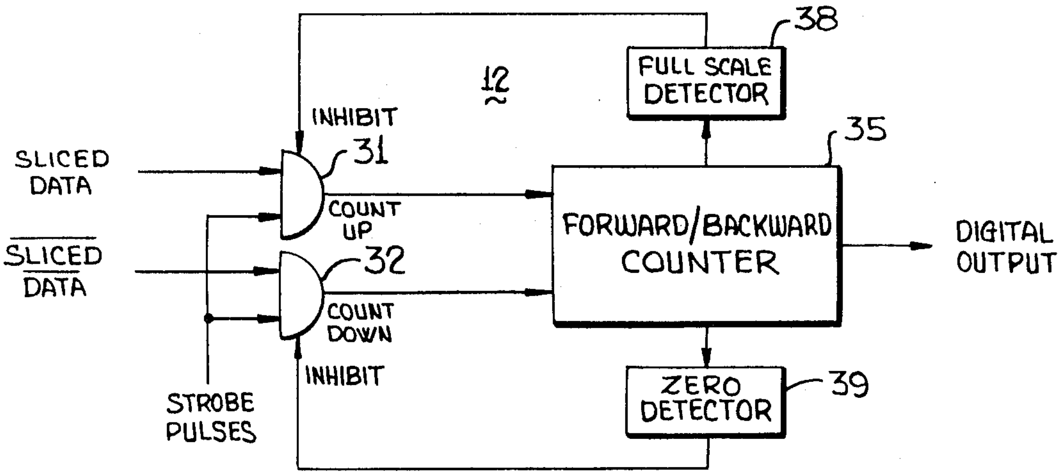
FIG. 2 is a circuit diagram of an embodiment of the aperture filter of the circuit of FIG. 1.

In a preferred embodiment of filter 12, shown in FIG. 2, positive sliced waveforms are applied to AND-gate 31 and the negative to AND-gate 32. Strobe pulses from strobe 15 are applied to these gates, at a rate many times the bit rate, to cause the respective gate to pass signal when a strobe pulse occurs, if a sliced signal of proper polarity is also then present at the other input of the respective gate. The outputs of gates 31, 32 are applied to forward/backward (i.e., reversible) counter 35, the output of gate 31 forcing a count up, and the output of gate 32 forcing a count down.

If the counter achieves full scale count that fact is detected by detector 38, which then inhibits gate 31, and prevents positive overflow. If the count goes to zero, zero detector 39 detects that fact and inhibits gate 32, to prevent negative overflow.

Figure 3:
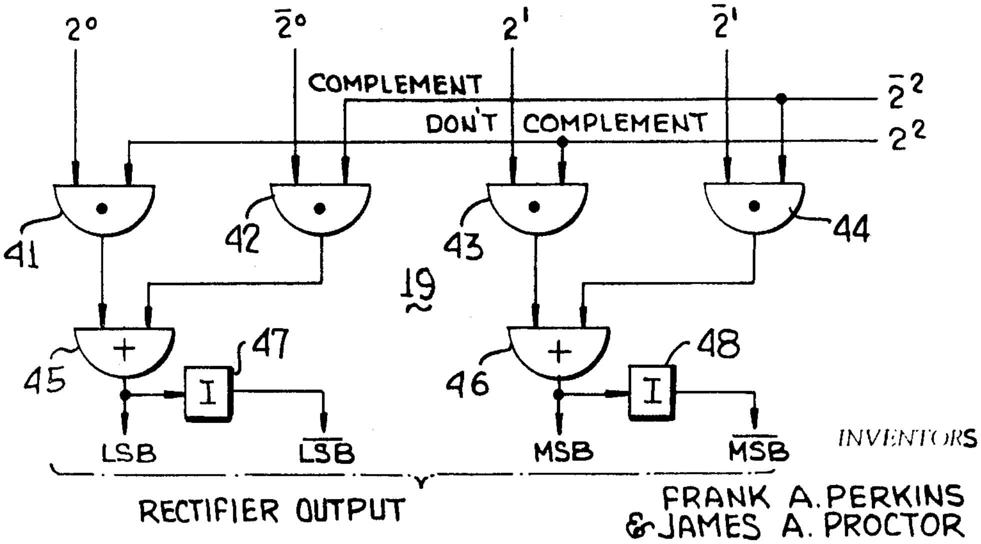
FIG. 3 is a circuit diagram of a typical embodiment of the rectifier of FIG. 1.

The counter 35 may be of any desired length, in theory, but the strobe rate for an $n$ stage must be $2^n$ times the bit rate. It follows that the counter goes from 0 to full and back, if input slices are alternately positive and negative, with no change in count if a negative slice follows a negative slice, and no change in count due to a second consecutive positive slice, so long as the slices are equal in duration. Midscale of the counter now represents a reference count, and it is the function of the rectifier 19 to obtain an absolute value relative to this reference value. The counter 35 is assumed binary with three output leads, representing three bits. Including an inverse for each bit, a total of six leads may carry signal from the counter 35. Rectification is then accomplished by sensing the first significant bit. If it is a one, the remaining bits are used directly, but if it is a zero they are complemented. The circuit of FIG. 3 implements this rule, as follows.

The most significant digit is applied to gates 41 and 43 if the most significant figure is a "1" and to gates 42, 44 if a "0." The least significant bit is applied to gates 41 and 42, according as it is a "0" and "1," and the second bit to gates 43 and 44 on the same basis. Gates 41–44, inclusive, are AND gates. The outputs of gates 41 and 42 are combined in OR-gate 45, and the outputs of gates 43 and 44 in OR-gate 46. These outputs represent LSB, or least significant bit, and MSB, or most significant bit. LSB and MSB are inverted by inverters 47, 48, to provide $\overline{\text{LSB}}$ and $\overline{\text{MSB}}$, since these are required by succeeding logic.

Figure 4:
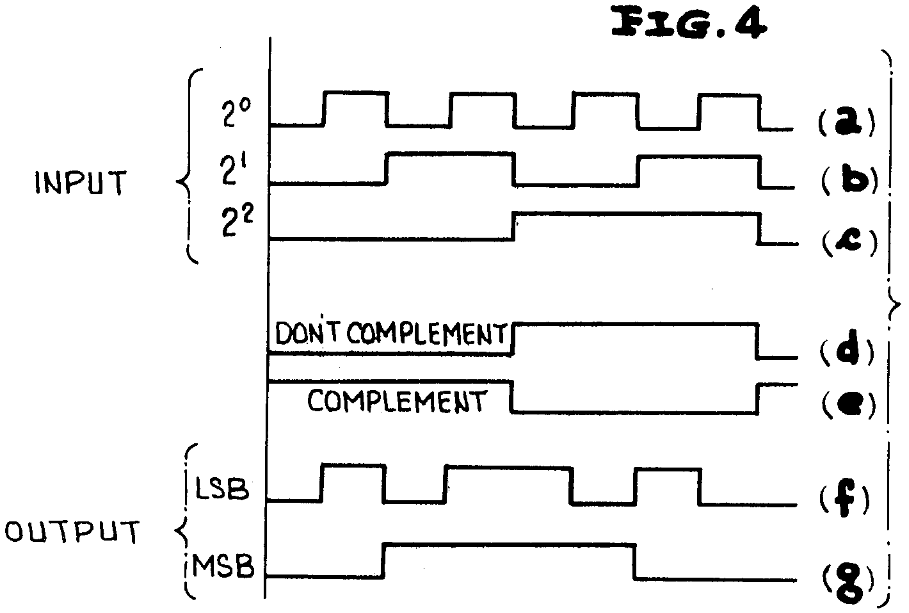
FIG. 4(*a*) through 4(*g*) are exemplary waveforms useful in explaining the circuit of FIG. 3.

Proceeding now to FIG. 4, we assume that 1 is more negative and 0 more positive. Plot (a) then represents the 0, 1 readings of the least significant digit, plot (b) of the middle digit, and plot (c) of the most significant digit, as binary counting proceeds, left to right being an increasing count axis, the several positions signifying, left to right, +3, +2, +1, 0,0, 1, 2, 3. So long as the most significant bit of plot (c) is a "1," we use the remaining digits directly and this represents the left half of the plot. When the MSB goes to 0, as in the right half of the plot (d), we complement the remaining bits.

In waveforms 4(*f*) and 4(g), a "1" is more negative, and a "0" more positive, and represents plot (a) for half the count and its inverse for the remaining half, proceeding left to right, and similarly for plot (b). The waveforms (f) and (g) then represent rectified LSB and rectified MSB, respectively.

Figure 5:
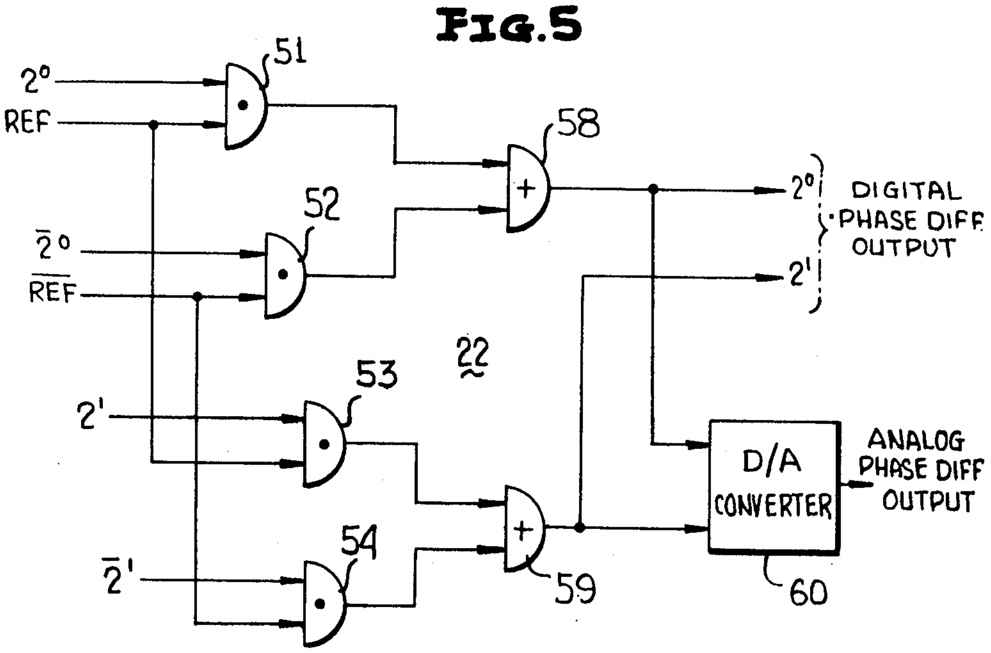
FIG. 5 is a circuit diagram of an embodiment of the multiplier of FIG. 1.

Proceeding now to FIG. 5, the clock reference is applied directly to AND-gates 51 and 53, and inverted to AND-gates 52 and 54. LSB is applied to gate 51, $\overline{\text{LSB}}$ to gate 52, MSB to gate 53 and $\overline{\text{MSB}}$ to gate 54. The outputs of gates 51 and 52 are combined in OR-gate 58, and the outputs of gates 53 and 54 in OR-gate 59. This implies that if LSB coincides with the reference an output will apply at the output of gate 58, and that the inverse will occur if $\overline{LSB}$ coincides with the inverse of the clock pulse. Similarly, if the reference coincides with MSB there will be an output from OR-gate 59, and the inverse will occur if the inverse of the reference pulse occurs with $\overline{MSB}$. If LSB coincides with $\overline{REF}$, the output will be zero from gate 58, and similarly the output of gate 59 can be zero. The input to D/A converter 60 can then be 00, 01, 10, 11 or the inverses of these, and a suitable analog signal, positive, negative, or zero, and if not zero of two possible positive and two possible negative magnitudes, can be derived from D/A converter 60, and applied to control the phase of the clock pulse. Of these magnitudes two are positive and two are negative, so that the output of the D/A converter can modify the phase of clock 25 in either sense, or not at all, as required to effect phase locking.

We claim:

1. A wide band phase detector for comparing the phase of locally generated clock pulses with incoming digital data occurring at a specified digit repetition rate, comprising means for digitally filtering said data to generate digital numbers representative of the rate of occurrence of said data relative to a preselected frequency, means responsive to said digital numbers for rectification thereof to provide sequential data signals representative of the absolute values of each digital number, and means responsive to said clock pulses and to said sequential data signals for detecting the difference in phase therebetween.

2. The combination according to claim 1 wherein said digital repetition rate is variable and wherein is further included means coupled to said digital filter means for varying said preselected frequency in accordance with said variable digit repetition rate.

3. The combination according to claim 1 wherein is included means responsive to said incoming digital data for generating a rectangular output signal constrained to either of two possible levels dependent upon the polarity of said incoming data.

4. The combination according to claim 2 wherein said digital filter means comprises a reversible digital counter, and wherein said means for varying frequency comprises a pulse generator having a variable pulse repetition rate, said filter means further including means responsive to the pulses from said pulse generator and to said digital data for gating said data upon coincidence therebetween to control the sense of counting of said counter in accordance with the information varying characteristic of said digital data.

5. In a digital phase-locked loop for PCM formats of variable bit rate and in which a frequency component is not available due to the character of the PCM format, wide band means for digitally filtering PCM signals, said wide band means including counter means for counting plural selectively timed pulses in one sense while said PCM signals are positive and in an opposite sense while said PCM signals are negative, means for terminating the count of said counter means when said count attains either of two limiting values, and means for deriving the count of said counter as a digital varying indication having counts above and below a midpoint of said count; and means for complementing the count of said counter to impart the same sense to all of said counts relative to said midpoint of said count of the counter.

6. The combination according to claim 5, wherein said last named means includes means for complementing one-half the value of said count of said counter and not the other half.

7. The combination according to claim 6, wherein is further provided a clock pulse source, and phase detector means responsive to the clock pulses provided by said clock pulse source and to the digitally rectified sawtooth configuration produced by said means for digitally rectifying for producing a digital phase indication representing the phase digital difference between said clock pulses and the bits of said PCM signals.

8. A digital phase-locked loop for locking clock pulses to a PCM format, comprising means for converting said PCM format on a per bit basis to a series of progressive counts having values between zero and a maximum value, representing bit duration, means complementing only half said progressive counts to produce a rectified version of said counts, a clock providing clock pulses, and phase detector means responsive to said rectified version of said counts and to said clock pulses for controlling the phases of said clock pulses.

9. The combination according to claim 8, wherein said phase detector means is a digital phase detector means having a digital phase representative output.

10. The combination according to claim 9, wherein is included means for converting said digital phase representative output to an analog signal, and means for controlling said clock in response to said analog signal.

* * * * *